(12) United States Patent
Szafraniec et al.

(10) Patent No.: US 8,290,375 B2
(45) Date of Patent: Oct. 16, 2012

(54) MODULATION BASED OPTICAL SPECTRUM ANALYZER

(75) Inventors: Bogdan Szafraniec, Sunnyvale, CA (US); Douglas M. Baney, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1135 days.

(21) Appl. No.: 12/127,507

(22) Filed: May 27, 2008

(65) Prior Publication Data
US 2009/0297142 A1 Dec. 3, 2009

(51) Int. Cl.
*H04B 10/04* (2006.01)
(52) U.S. Cl. .................. 398/183; 398/185; 398/186

(58) Field of Classification Search ............... 398/1–34, 398/158, 198, 200, 201, 183–188; 359/237
See application file for complete search history.

(56) References Cited

U.S. PATENT DOCUMENTS

| 6,909,496 B2 * | 6/2005 | Mori ............................ 356/73.1 |
| 2006/0120483 A1 * | 6/2006 | McAlexander et al. ...... 375/316 |

* cited by examiner

*Primary Examiner* — Dzung Tran

(57) ABSTRACT

An optical spectrum analyzer and a method of spectrally analyzing an optical signal. The optical spectrum analyzer includes a wave shaper such as an optical modulator that shapes an optical signal, a dispersive element such as a dispersive fiber in which the shaped optical signal is dispersed, a detector that provides an output signal indicative of the dispersed shaped optical signal, and a signal processor that analyzes the output signal, for example by calculating a transform such as an inverse Fourier transform or a Fourier transform of the output signal, to provide a frequency spectrum of the optical signal.

19 Claims, 3 Drawing Sheets

MODULATION BASED OPTICAL SPECTRUM ANALYZER

BACKGROUND

There are many occasions when it is necessary to determine the spectrum (optical power distribution over frequency) of an optical signal (a beam of light). This measurement need extends from ultraviolet wavelengths (less than 400 nanometers), through visible wavelengths (400 to 800 nm) on into the near-infrared wavelengths (800 to 2,000 nm) often used for fiber optic telecommunications, and in the infrared wavelengths (more than 2,000 nm) often used for spectroscopic identification of materials. This can be done qualitatively at visible wavelengths by an ordinary prism that splits a beam of light into its various colors.

To obtain a quantitative indication of the various frequencies in a beam of light and of their relative strengths, the prism can be mechanically pivoted such that the various color beams emanating from the prism are sequentially focused onto a photodetector. The magnitudes of the photodetector output at the various angular deflections of the prism give the spectral content of the light beam.

Limitations of the sensitivity and accuracy of the prism spectrum analyzer have led to more sophisticated optical spectrum analyzers. Some of these have used a diffraction grating. Others have been based on a scanning Michelson-interferometer. Still others have used an optical heterodyne arrangement employing a scanning laser local oscillator configured from a laser with a mechanically tuned external cavity.

A Michelson spectrum analyzer uses a mechanically moving mirror to generate an interference pattern from which a measure of coherence is obtained. A mathematical calculation known as the Fourier transform is then performed to obtain the frequency spectrum from this coherence measurement. When performed on a set of discrete measurements, this calculation is referred to as a DFT (digital Fourier transform). In practice, this calculation is carried out by a computer using an FFT (fast Fourier transform) algorithm.

All such instruments depend on high-precision mechanical motion of an optically reflective or transmissive element.

There has been a need for an optical spectrum analyzer that can provide high accuracy and good signal-to-noise performance with no moving parts.

SUMMARY

Embodiments of the invention provide an optical spectrum analyzer with no moving optical parts. An embodiment includes a wave shaper that shapes an optical signal, a dispersive element in which the shaped optical signal is dispersed, a detector that provides an output signal indicative of the dispersed shaped optical signal; and a signal processor that analyzes the output signal to provide a frequency spectrum of the optical signal. In some embodiments the wave shaper comprises an optical modulator that modulates the optical signal according to an electrical signal such as one or more pulses or sinusoids or a sinusoidal swept-frequency signal. In some embodiments the signal processor calculates a transform such as a Fourier transform or an inverse Fourier transform of the output signal.

Embodiments of the invention provide a method of spectrally analyzing an optical signal including shaping an optical signal, for example by modulating it, time-dispersing the shaped optical signal, detecting the time-dispersed shape of the optical signal; and analyzing the time-dispersed shape to find the spectrum of the optical signal.

BRIEF DESCRIPTION OF THE DRAWINGS

Illustrative embodiments of the invention are illustrated in the drawings, in which.

DETAILED DESCRIPTION

Figure 1:
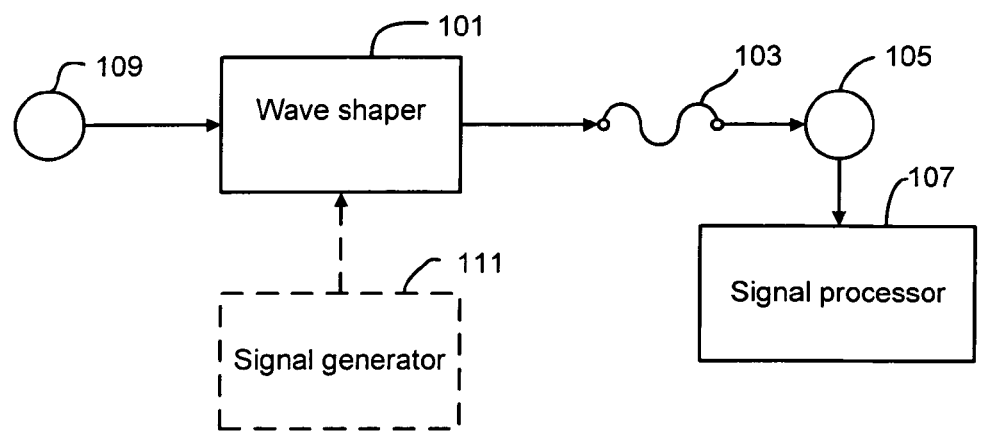
FIG. 1 is an optical schematic representation of an optical spectrum analyzer embodying the invention.

As shown in FIG. 1, an optical spectrum analyzer according to some embodiments of the invention includes a wave shaper 101 that shapes an optical signal, a dispersive element 103 in which the shaped optical signal is time-dispersed, a detector 105 that provides an output signal indicative of the dispersed shaped optical signal, and a signal processor 107 that analyzes the output signal to provide a frequency spectrum of the optical signal. The optical signal originates from a source 109 which may be, for example, an LED, a laser, or light that has passed through an absorbing medium such as gas, liquid or solid where its spectral absorption properties are of interest, an optical network or some other device that provides a beam of light.

In some embodiments the wave shaper comprises an optical modulator. A signal generator 111 may be coupled to the optical modulator, the optical modulator being operative to modulate the optical signal according to a signal from the signal generator. The signal generator may be a pulse generator that produces one or a plurality of pulses, and in this case the shaped optical signal that emanates from the optical modulator comprises one or a plurality of pulses of light. The signal generator may be a periodic waveform generator that provides one or a plurality of signals, for example one or more sinusoidal signals, and in this case the optical modulator modulates the optical signal accordingly. The signal generator may be an RF swept-frequency generator.

In some embodiments the optical modulator modulates both intensity and phase of the optical signal. In some such embodiments the signal generator may provide a variable voltage signal such as a bias signal as well as a periodic signal such as a sinusoidal swept-frequency signal.

In some embodiments an analog swept-frequency generator is used. Other embodiments use a network analyzer as the swept-frequency generator and signal processor. The sweep may be continuous or stepped in discrete increments.

In some embodiments the optical modulator comprises a Mach-Zehnder interferometric modulator. Such a modulator may be fabricated within an electro-optic crystal, for example lithium niobate (LiNbO3), having a refractive index that varies according to an electrical signal applied to it. The applied electrical signal alters the refractive index of the crystal and thereby modulates the phase of the optical waves. The phase modulation is converted into intensity modulation within a Mach-Zehnder interferometer structure.

The dispersive element 103 spreads the various optical frequencies comprising the optical signal over time. This happens because signals of different optical frequencies propagate through the dispersive element at different velocities. Thus, each frequency component of the dispersed optical signal arrives at the detector 105 at a different time than the others.

In some embodiments the dispersive element comprises an optical fiber. This may be a single-mode fiber with a length on the order of 100 kilometers. These fibers are optically dispersive. In some such fibers the dispersion may exceed one picosecond per nanometer of optical spectrum per kilometer of fiber. In this context a nanometer of optical spectrum refers to the difference between the wavelengths of two optical signals that propagate through the fiber at the same time. For example, if two signals, one having a 1500 nm wavelength and the other having a 1505 nm wavelength, propagate through a 100 km fiber having a dispersion of 1 ps/nm/km, at the output of the fiber one signal would be delayed with respect to the other by 1 ps/nm/km×5 nm×100 km=500 ps ("ps" denotes picoseconds).

In some embodiments a dispersion-compensating fiber may be used. Ordinarily such a fiber receives a signal that has been undesirably time-dispersed and compensates for such dispersion by dispersing in an opposite manner. In the present invention, the input signal to the dispersing element is not dispersed, and therefore a dispersion-compensating fiber actually has the effect of dispersing the input signal. The dispersion of dispersion-compensating fibers is typically several times stronger in magnitude that in ordinary fibers.

For example, a commonly-used single mode (SM) fiber is an SM-28 fiber. This fiber has a dispersion of about −18 ps/nm/km at wavelengths of around 1500 nm. Dispersion in a dispersion-compensating fiber is of opposite sign (is positive) and may be on the order of ten times greater in magnitude than the dispersion of a single-mode fiber. If the difference between the wavelengths of two signals were 5 nm and the length of the ordinary SM-28 fiber were 10 km, the difference in propagation times would be 18 ps/nm/km×5 nm×10 km=900 ps. Although 10 km seems like a large amount of fiber to house in a laboratory instrument, in actuality a fiber of that length can be contained in a space smaller than 125 cubic inches (a cube 5 inches on a side).

In many dispersive materials dispersion is wavelength-dependent, and therefore an appropriate dispersive element must be selected according to the wavelength range of interest.

In some embodiments the dispersive element comprises a chirped fiber grating. This type of dispersive element may be only a few meters in length.

In some embodiments, for example, those in which the modulated optical signal is a pulse, the optical spectrum may be determined by considering the dispersed pulse. For example, an optical pulse that comprises two discrete wavelengths will separate into two pulses due to the difference in propagation velocity at different wavelengths in a dispersive element. The time separation between the received pulses and their relative power corresponds to the wavelength separation and relative powers of the two spectral components of the optical signal. Thus, the observed impulse response actually corresponds to the optical spectrum. The signal processor identifies the spectral components of that response. In some other embodiments multiple optical pulses or patterns can be used to improve the estimation of the impulse response.

In other embodiments, the impulse response is determined from the transfer function by employing the inverse Fourier transform. In this case a sinusoidal swept-frequency signal or other periodic signal is used as the modulating signal and the transfer function is determined from the received signal. The signal processor, which may comprise a computer programmed to calculate an inverse Fourier transform, calculates the impulse response from the transfer function, as will be discussed in more detail below. After the impulse response has been calculated the spectral components may be identified.

In some embodiments the sweep generator and the signal processor may be comprised in a single instrument such as an electrical network analyzer. An example of an electrical network analyzer is the model N9020A, manufactured by Agilent Technologies, Inc., of Santa Clara, Calif.

Figure 2:
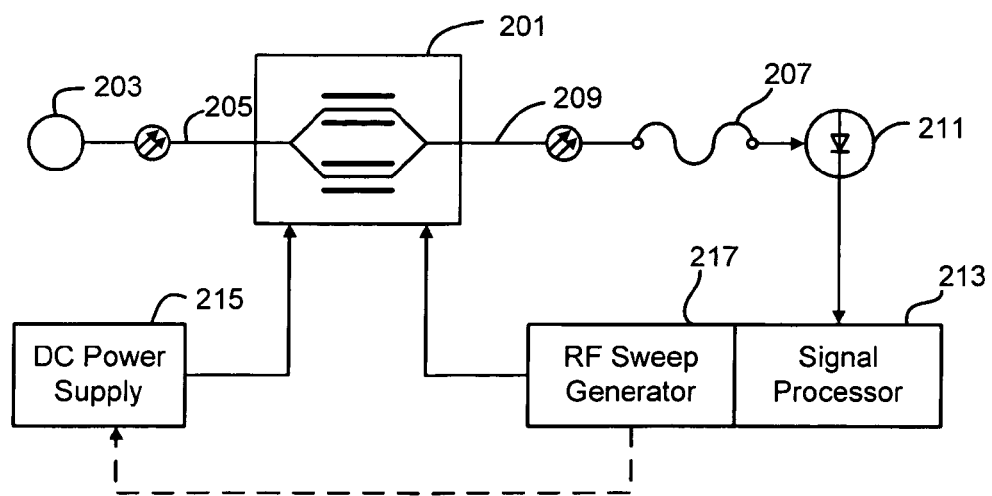
FIG. 2 is an optical schematic representation of another optical spectrum analyzer embodying the invention.

Another embodiment of an optical spectrum analyzer according to the invention is shown in FIG. 2. An optical modulator 201 modulates an optical signal received from a source 203 through a medium such as a waveguide 205, or the optical modulator may be directly coupled to the source. A dispersive element 207 receives the modulated optical signal through a medium such as a waveguide 209, or the dispersive element may be directly coupled to the optical modulator. A detector such as a photodetector 211 provides an output signal indicative of the dispersed shaped optical signal. A signal processor 213 analyzes the output signal to provide a frequency spectrum of the optical signal.

A photodetector is a square-law device. The output signal of such a device is proportional to the intensity of the dispersed modulated optical signal. The signal processor 213 may include an electrical network analyzer that measures amplitude and phase of the output signal.

An intensity-modulated optical signal produced by an ideal intensity modulator can be represented in the frequency domain by a carrier and two sidebands, both sidebands having the same phase. These two sidebands are subject to dispersion in the dispersing element, and therefore they propagate through the dispersing element with slightly different velocities, causing a phase shift between them. If the modulation frequency is high enough and the dispersion large enough, this phase shift between the sidebands can reach the value of $\pi$. A phase shift of $\pi$ corresponds to a conversion of intensity modulation into phase modulation. In other words, the intensity modulation of the optical signal has been converted into phase modulation, rendering the direct detection of the intensity modulation impossible. This is known as "signal fading".

Signal fading may be avoided by using the modulator to deliberately introduce phase modulation that is converted by the dispersing element into detectable intensity modulation. Since a Mach-Zehnder modulator comprises phase modulators within an interferometer structure, it may be used in a way that controls a relative content of phase modulation and intensity modulation. This is accomplished by applying a sinusoidal signal to one arm of the interferometer in the Mach-Zehnder modulator while a bias voltage, for example from a power supply 215, is applied to the other arm to control the relative content of phase modulation and intensity modulation. The bias voltage may be swept together with the frequency of the sinusoidal signal, for example under the control of an RF swept-frequency generator 217, so as to minimize signal fading at the detector.

The signal processor 213 and the sweep generator 217 may be separate units as shown, or they may be incorporated in a single instrument such as an electrical network analyzer as noted above.

In some embodiments the signal processor performs an inverse Fourier transform. The spectrum of the optical signal is obtained by calculating the inverse Fourier transform of the electrical transfer function. The inverse Fourier transform of the electrical transfer function, as described above, recovers impulse response of the dispersive element. The unique mapping between the delays contained within the impulse response and wavelengths allows for reconstruction of the spectrum as more particularly described in the following paragraphs.

An optical signal to be analyzed may be described as a sum of purely sinusoidal (monochromatic) optical signals. Specifically, an optical signal having a plurality of frequency components at the input 109 of FIG. 1 can be expressed in complex notation as a sum:

$$\sum_n a_n \exp(j\omega_n t)$$

where:
$a_n$ is the amplitude of the n-th frequency component, and
$\omega_n$ is the frequency of the n-th frequency component.

All components $a_n \exp(j\omega_n t)$ of the input optical signal are intensity modulated at the electrical modulation frequency $\omega_e$, transmitted through the dispersive element and detected by a square-law detector. Within the dispersive element, the individual components of an optical signal experience a wavelength dependent delays $\tau_n$ that at the electrical modulation frequency $\omega_e$ leads to phase shifts $\omega_e \tau_n$. The square-law detector provides an electrical signal that is proportional to the intensity (power) of the optical signal. Therefore, at the detector, the electrical spectral component related to the n-th component of the optical signal can be described by the following expression: where:

$$\eta(a_n)^2 \cos(\omega_e t - \omega_e \tau_n)$$

$\omega_e$ is the electrical modulation frequency,
$\tau_n$ is the time delay experienced by the n-th frequency component of the optical signal within the dispersive element, and
$\eta$ is a multiplier whose value depends on the modulation depth and receiver responsivity.

For simplicity, it is assumed that $\eta=1$. The processor measures the amplitude and phase of the electrical signal produced by the detector at the electrical modulation frequency $\omega_e$. That electrical signal comprises contributions of all components of the optical signal and can be represented by a sum:

$$X(\omega_e) = \sum_n p_n \exp(-j\omega_e \tau_n) \quad (1)$$

where $p_n=(a_n)^2$, and $p_n$ represents the power of the n-th component of the optical signal.

Calculating the inverse Fourier transform of the signal described by Eq. (1) will give numerical values for $p_n$ and $\tau_n$.

For a set of m discrete values of $X(\omega_e)$ uniformly sampled at N points, the inverse DFT (digital Fourier transform) is given by:

$$x_k = \sum_{k=0}^{N-1} X_m \exp(j2\pi mk/N) \quad (2)$$

The result of equation (2) is used to obtain estimates for numerical values of $p_n$ and $\tau_n$. The numerical values of $\tau_n$ are used to determine the corresponding optical frequencies $\omega_n$ based on the known characteristics of the dispersive element. In this way the optical spectrum is reconstructed.

If the characteristics of the dispersive element are not known, a known optical source such as a tunable laser can be used to determine the mapping between delay and wavelength in the dispersive element and thereby perform calibration.

A fast Fourier transform (FFT) algorithm is an efficient way to compute a DFT. There are many such algorithms and these are well known in the art. One example is the Colley-Tukey algorithm, a "divide and conquer" algorithm that recursively breaks down a DFT of any size $N=N_1 N_2$ into many smaller DFTs of sizes $N_1$ and $N_2$. The transform may be divided into two pieces of size N/2 at each step, but any factorization, not just a powers-of-two factorization, can be used. Some implementations rearrange the algorithm to avoid explicit recursion.

In some embodiments a sweep of up to 10 GHz may be used. This implies that the smallest unit of time after the inverse Fourier transform is 1/10 Hz=100 ps. For a dispersion of 1,000 ps/nm, the smallest unit in a wavelength space is 100 ps/1000 ps/nm=0.1 nm. If 10,000 points are taken during a single sweep, then a total wavelength coverage is 10,000×0.1 nm=1000 nm. This assumes the dispersion is constant over the wavelength range of interest. This describes a construction of an optical spectrum analyzer that has resolution of 0.1 nm and wavelength coverage of 1000 nm.

Figure 3:
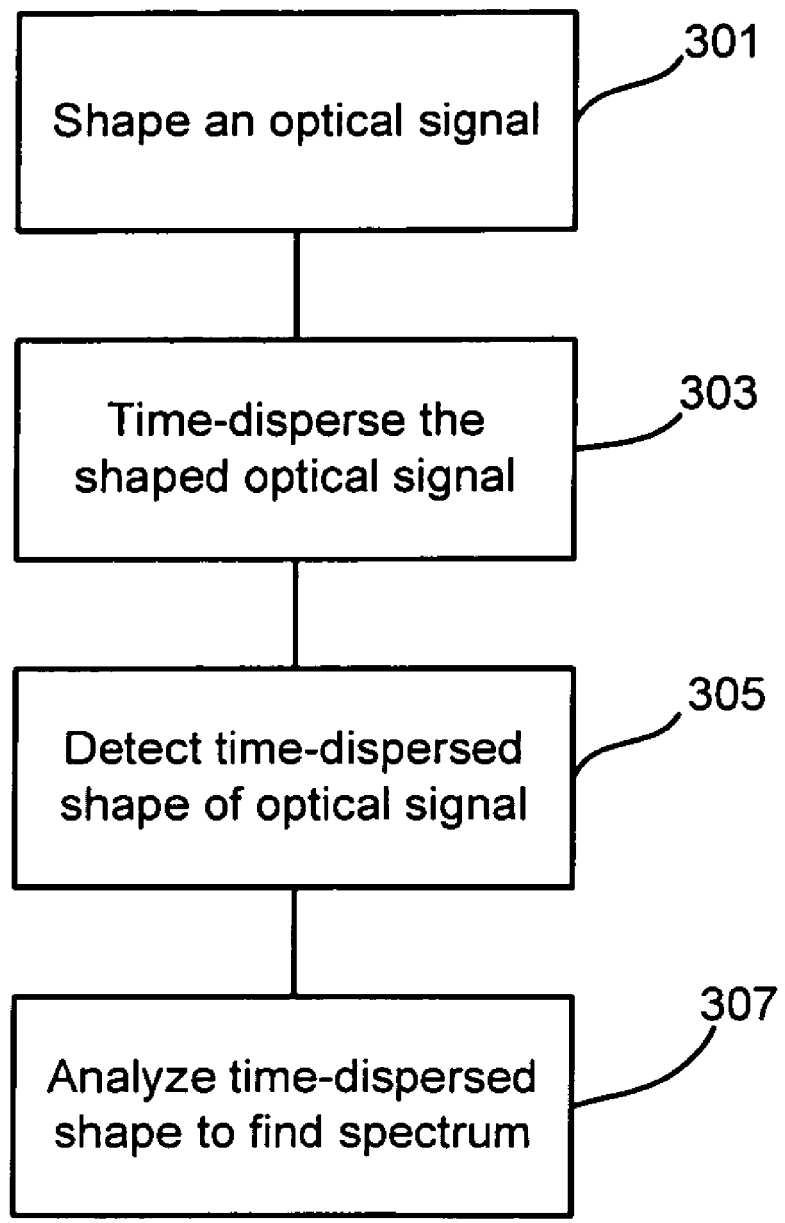
FIG. 3 is a flowchart illustrating a method of determining the spectrum of an optical signal according to the principles of the invention.

As shown in FIG. 3, a method of spectrally analyzing an optical signal includes shaping an optical signal 301, time-dispersing the shaped optical signal 303, detecting the time-dispersed shape of the optical signal 305, and analyzing the time-dispersed shape to find the spectrum of the optical signal 307. In some embodiments analyzing the output signal includes calculating a Fourier transform or an inverse Fourier transform by using a fast Fourier transform algorithm. In some embodiments shaping the optical signal means modulating it according to a pulse modulation signal, a periodic modulation signal, a swept sinusoidal modulation signal or the like. In some embodiments amplitude is modulated, and in some embodiments phase is also modulated.

Figure 4:
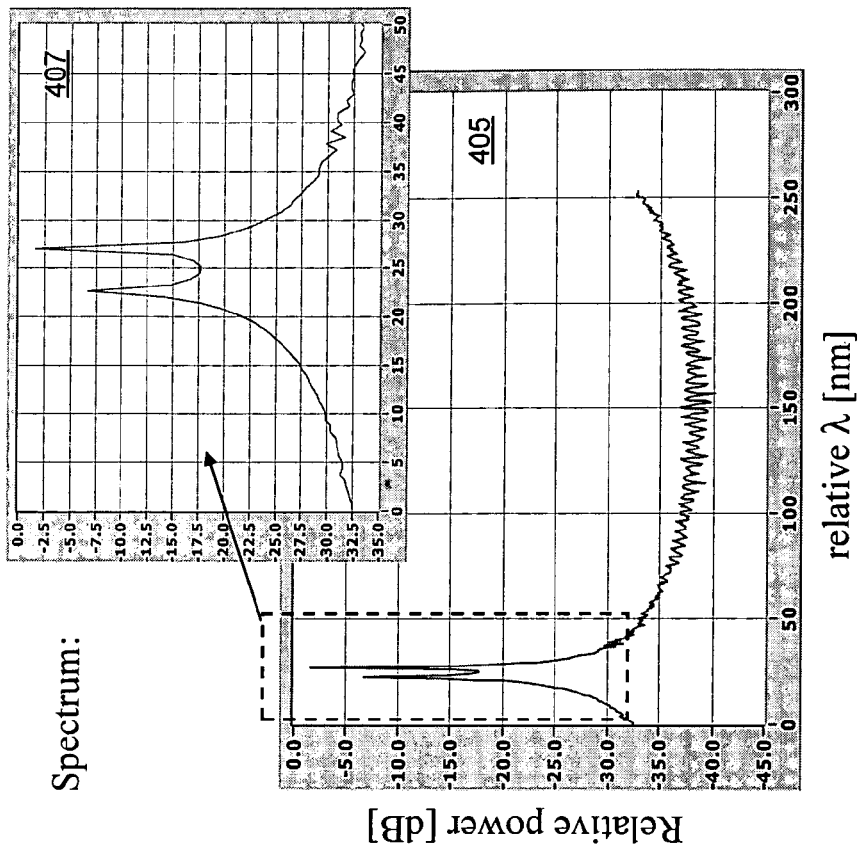
FIG. 4 is a graphical depiction of an optical spectrum of an optical signal as determined by an optical spectrum analyzer embodying the invention.
Figure 4:
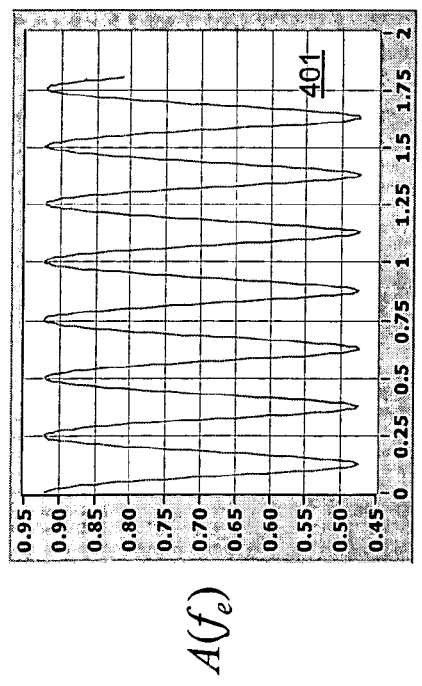
Figure 4:
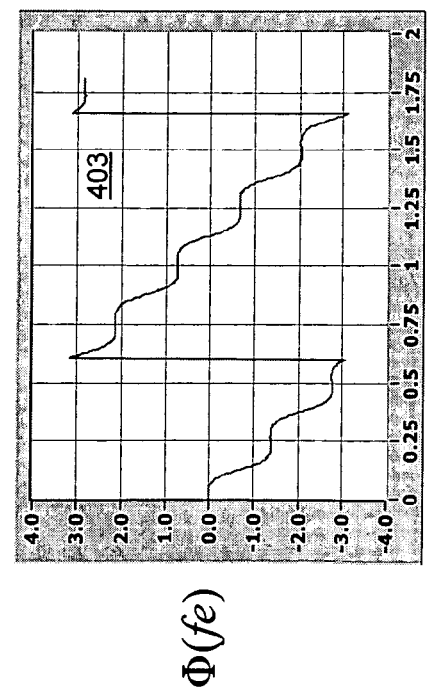

FIG. 4 provides a graphical representation of a spectral analysis of an optical signal performed according to one embodiment of the invention. A first graph 401 depicts amplitude $A(f_e)$ of the detected electrical signal as a function of a swept electrical frequency $\omega_e=2\pi f_e$. A second graph 403 depicts phase $\Phi(f_e)$ of the detected electrical signal as a function of a swept electrical frequency $\omega_e=2\pi f_e$. A third graph 405 depicts the result of performing an inverse Fourier transform of the complex signal A exp (j$\Phi$), showing impulse response that represents optical spectrum. An inset graph 407 shows a portion of the graph 405 in more detail. The example illustrated in FIG. 4 shows an optical spectrum having two spectral peaks.

The mathematical similarity of the inverse Fourier transform and the Fourier transform allows for use of either algorithm. For example, if electrical network analyzer contains the digital implementation of FFT algorithm, its use allows for recovery of the impulse response from the measured transfer function and for reconstruction of the optical spectrum. Other transforms could be used as well, for example a wavelet transform, a Laplace transform, etc.

Modifications may be made to the illustrated and described embodiments without departing from the scope of the invention. The invention is to be limited only by the claims.

What is claimed is:
1. An optical spectrum analyzer comprising:
   a wave shaper that shapes an optical signal, wherein the wave shaper comprises an optical modulator;
   a signal generator coupled to the optical modulator, the optical modulator operative to modulate both the inten- sity and the phase of the optical signal according to a signal from the signal generator;

a dispersive element in which the shaped optical signal is dispersed;

a detector that provides an output signal indicative of the dispersed shaped optical signal; and a signal processor that analyzes the output signal to provide a frequency spectrum of the optical signal.

2. An optical spectrum analyzer as in claim 1 wherein the signal generator comprises a pulse generator.

3. An optical spectrum analyzer as in claim 1 wherein the signal generator comprises a periodic waveform generator.

4. An optical spectrum analyzer as in claim 3 wherein the signal generator comprises a sinusoidal swept frequency generator.

5. An optical spectrum analyzer as in claim 3 wherein the signal generator comprises a variable bias voltage source.

6. An optical spectrum analyzer as in claim 1 wherein the dispersive element comprises an optical fiber.

7. An optical spectrum analyzer as in claim 6 wherein the optical fiber comprises a dispersion-compensating fiber.

8. An optical spectrum analyzer as in claim 6 wherein the optical fiber comprises a single-mode fiber having a dispersion that exceeds one picosecond per nanometer per kilometer.

9. An optical spectrum analyzer as in claim 1 wherein the dispersive element comprises a chirped fiber grating.

10. An optical spectrum analyzer as in claim 1 wherein the signal processor comprises a computer programmed to calculate a transform of the output signal.

11. An optical spectrum analyzer as in claim 10 wherein the signal processor comprises a computer programmed to calculate an inverse Fourier transform of the output signal.

12. An optical spectrum analyzer as in claim 10 wherein the signal processor comprises a computer programmed to calculate a Fourier transform of the output signal.

13. A method of spectrally analyzing an optical signal comprising:

shaping an optical signal, wherein shaping the optical signal comprises modulating the amplitude and phase of the optical signal;

time-dispersing the shaped optical signal;

detecting the time-dispersed shape of the optical signal; and analyzing the time-dispersed shape to find the spectrum of the optical signal.

14. A method as in claim 13 wherein analyzing the output signal comprises calculating a transform thereof.

15. A method as in claim 14 wherein analyzing the output signal comprises calculating an inverse Fourier transform thereof.

16. A method as in claim 14 wherein analyzing the output signal comprises calculating a Fourier transform thereof.

17. A method as in claim 13 wherein shaping the optical signal comprises modulating the optical signal according to a pulse modulation signal.

18. A method as in claim 13 wherein shaping the optical signal comprises modulating the optical signal according to a periodic modulation signal.

19. A method as in claim 13 wherein shaping the optical signal comprises modulating the optical signal according to a swept sinusoidal modulation signal.

* * * * *